(12) United States Patent
Takasuka et al.

(10) Patent No.: US 7,130,259 B2
(45) Date of Patent: Oct. 31, 2006

(54) OPTICAL PICK-UP APPARATUS

(75) Inventors: Shouichi Takasuka, Osaka (JP); Kouji Ise, Takatsuki (JP); Hiroyuki Ishida, Takatsuki (JP); Masayuki Ono, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 288 days.

(21) Appl. No.: 10/420,988

(22) Filed: Apr. 22, 2003

(65) Prior Publication Data

US 2003/0202450 A1    Oct. 30, 2003

(30) Foreign Application Priority Data

Apr. 24, 2002  (JP)  .............. 2002-123083

(51) Int. Cl.
*G11B 7/135*    (2006.01)

(52) U.S. Cl. ............................................... 369/112.07
(58) Field of Classification Search ............ 369/112.07
See application file for complete search history.

(56) References Cited

U.S. PATENT DOCUMENTS

| | | | |
|---|---|---|---|
| 6,654,336 B1 * | 11/2003 | Kadowaki et al. | 369/112.07 |
| 6,822,771 B1 * | 11/2004 | Funato et al. | 359/15 |
| 2002/0196726 A1 * | 12/2002 | Takeda | 369/112.04 |
| 2003/0165106 A1 * | 9/2003 | Dambach et al. | 369/112.07 |

FOREIGN PATENT DOCUMENTS

| | | |
|---|---|---|
| CN | 1300061 A | 6/2001 |
| EP | 1 096 482 A2 | 5/2001 |
| JP | 3-250435 | 11/1991 |
| JP | 8-17069 | 1/1996 |
| JP | 10-3673 | 11/1998 |
| JP | 2003-196860 | 7/2003 |

* cited by examiner

*Primary Examiner*—Wayne Young
*Assistant Examiner*—Lixi Chow
(74) *Attorney, Agent, or Firm*—Hamre, Schumann, Mueller & Larson, P.C.

(57) ABSTRACT

An optical pick-up apparatus includes: a semiconductor laser light source that generates an optical beam; a diffraction grating that divides the optical beam into a main beam and side beams; an optical element that guides the main beam and the side beams that are generated by the diffraction grating onto an optical information medium; and a photodetector that detects a signal from reflected light reflected from the optical information medium. The semiconductor laser light source is configured with a 2-wavelength semiconductor laser device in which a semiconductor laser chip that generates an optical beam having a wavelength of $\lambda 1$ and a semiconductor laser chip that generates an optical beam having a wavelength of $\lambda 2$ are integrated into one chip or are arranged in proximity to each other. The diffraction grating has one grating period $\Lambda$ by which each of the optical beams having the wavelength $\lambda 1$ and the optical beam having the wavelength $\lambda 2$, which are generated by the 2-wavelength semiconductor laser device, is divided into a main beam and side beams. The apparatus is applicable to two kinds of optical information media having different track pitches.

2 Claims, 3 Drawing Sheets

OPTICAL PICK-UP APPARATUS

BACKGROUND OF THE INVENTION

1. Field of the Invention

The present invention relates to an optical pick-up apparatus that is a key component of an optical disc drive apparatus. More particularly, the present invention relates to an optical pick-up apparatus for recording, reproducing and erasing information with respect to both of a group of discs including CD, CD-ROM, CD-R and CD-RW (hereinafter called "CD group disc") and a group of discs including DVD, DVD-ROM, DVD-RAM, DVD-R and DVD-RW (hereinafter called "DVD group disc"), which have different track pitches from each other.

2. Related Background Art

A configuration and an operation of a conventional optical pick-up apparatus will be described below, with reference to FIG. 3. This apparatus enables information to be recorded, reproduced and erased with respect to a CD group disc 110 and a DVD group disc 111. Although FIG. 3 shows both of the CD group disc 110 and the DVD group disc 111 for the purpose of illustration, as a practical matter, only one of these discs is loaded thereon. The CD group disc 110 or the DVD group disc 111 is placed on a common plane P facing an objective lens 109. On the reverse side of the plane P, recording surfaces 110a and 111a are provided. Since the CD group disc 110 has a thickness larger than that of the DVD group disc 111, the recording surface 110a of the CD group disc 110 is positioned further from the objective lens 109 than the recording surface 111a of the DVD group disc 111.

This apparatus has an infrared semiconductor laser device 101 and a red semiconductor laser device 102. In optical paths between the laser devices 101 and 102 and the discs 110 and 111, 3-beam generating diffraction gratings 103 and 104, a beam splitter 105, a collimator lens 106, a beam splitter 107, a condenser lens 112, a photodetector 113, a mirror 108 and the objective lens 109 are arranged. The 3-beam generating diffraction gratings 103 and 104 form three beams from optical beams emitted from the infrared semiconductor laser device 101 and the red semiconductor laser device 102, respectively. The beam splitter 105 guides the beams that have passed through the 3-beam generating diffraction gratings 103 and 104 onto the common optical axis. The collimator lens 106, the objective lens 109 and the condenser lens 112 function as a light-gathering device. The beam splitter 107 divides the reflected light from the disc 110 or 111.

This optical pick-up apparatus operates as follows: when recording, reproducing or erasing information with respect to the CD group disc 110, the infrared semiconductor laser device 101 operates. An optical beam emitted from the infrared semiconductor laser device 101, which is indicated by a solid line, is diffracted by the 3-beam generating diffraction grating 103 so as to be divided into three optical beams (a main beam as zero-order diffracted light and side beams as±first-order diffracted light). These three optical beams pass through the beam splitter 105, then are converted from the divergent beams to parallel beams by the collimator lens 106, and enter into the objective lens 109 via the mirror 108 to be focused onto the CD group disc 110. Reflected light from the CD group disc 110 passes through the objective lens 109 and the mirror 108, is directed to a different direction by the beam splitter 107, and is focused onto the photodetector 113 by the condenser lens 112. From the main beam and side beams incident on the photodetector 113, an RF signal, a focus error signal and a tracking error signal are detected.

Meanwhile, when recording, reproducing or erasing information with respect to the DVD group disc 111, the red semiconductor laser device 102 operates. An optical beam emitted from the red semiconductor laser device 102, which is indicated by a dashed line, is diffracted by the 3-beam generating diffraction grating 104 so as to be divided into three optical beams (a main beam as zero-order diffracted light and side beams as±first-order diffracted light). These three optical beams are directed to a different direction by the beam splitter 105, then are converted from the divergent beams to parallel beams by the collimator lens 106, and enter into the objective lens 109 via the mirror 108 to be focused onto the DVD group disc 111. Reflected light from the DVD group disc 111 passes through the objective lens 109 and the mirror 108, is directed to a different direction by the beam splitter 107, and is focused onto the photodetector 113 by the condenser lens 112. From the main beam and side beams incident on the photodetector 113, an RF signal, a focus error signal and a tracking error signal are detected.

The conventional optical pick-up apparatus shown in FIG. 3, however, requires the two semiconductor laser devices, the two diffraction gratings and the beam splitter 105 for guiding the emitted light from the two semiconductor laser devices to the common optical axis in order to be compatible with the CD group disc 110 and the DVD group disc 111. Therefore, it is difficult to downsize the optical pick-up apparatus. In addition, since a large number of optical components are required, which complicates the positional adjustment among the respective optical components, the cost required for components and for adjusting the components increases significantly as compared with an optical pick-up apparatus dealing with a single type of disc.

SUMMARY OF THE INVENTION

Therefore, with the foregoing in mind, it is an object of the present invention to downsize an optical pick-up apparatus that records, reproduces or erases information with respect to a CD group disc and a DVD group disc and to reduce the cost for the apparatus.

An optical pick-up apparatus of the present invention includes: a semiconductor laser light source that generates an optical beam; a diffraction grating that divides the optical beam into a main beam and side beams; an optical element that guides the main beam and the side beams that are generated by the diffraction grating onto an optical information medium; and a photodetector that detects a signal from reflected light reflected from the optical information medium. The semiconductor laser light source is configured with a 2-wavelength semiconductor laser device in which a semiconductor laser chip that generates an optical beam having a wavelength of $\lambda 1$ and a semiconductor laser chip that generates an optical beam having a wavelength of $\lambda 2$ are integrated into one chip or are arranged in proximity to each other. The diffraction grating has one grating period $\Lambda$ by which each of the optical beams having the wavelength $\lambda 1$ and the optical beam having the wavelength $\lambda 2$, which are generated by the 2-wavelength semiconductor laser device, is divided into a main beam and side beams. The optical pick-up apparatus is configured so as to record or reproduce information with respect to optical information media having different track pitches and perform tracking control associated with the recording and the reproducing.

DETAILED DESCRIPTION OF THE INVENTION

Figure 1:
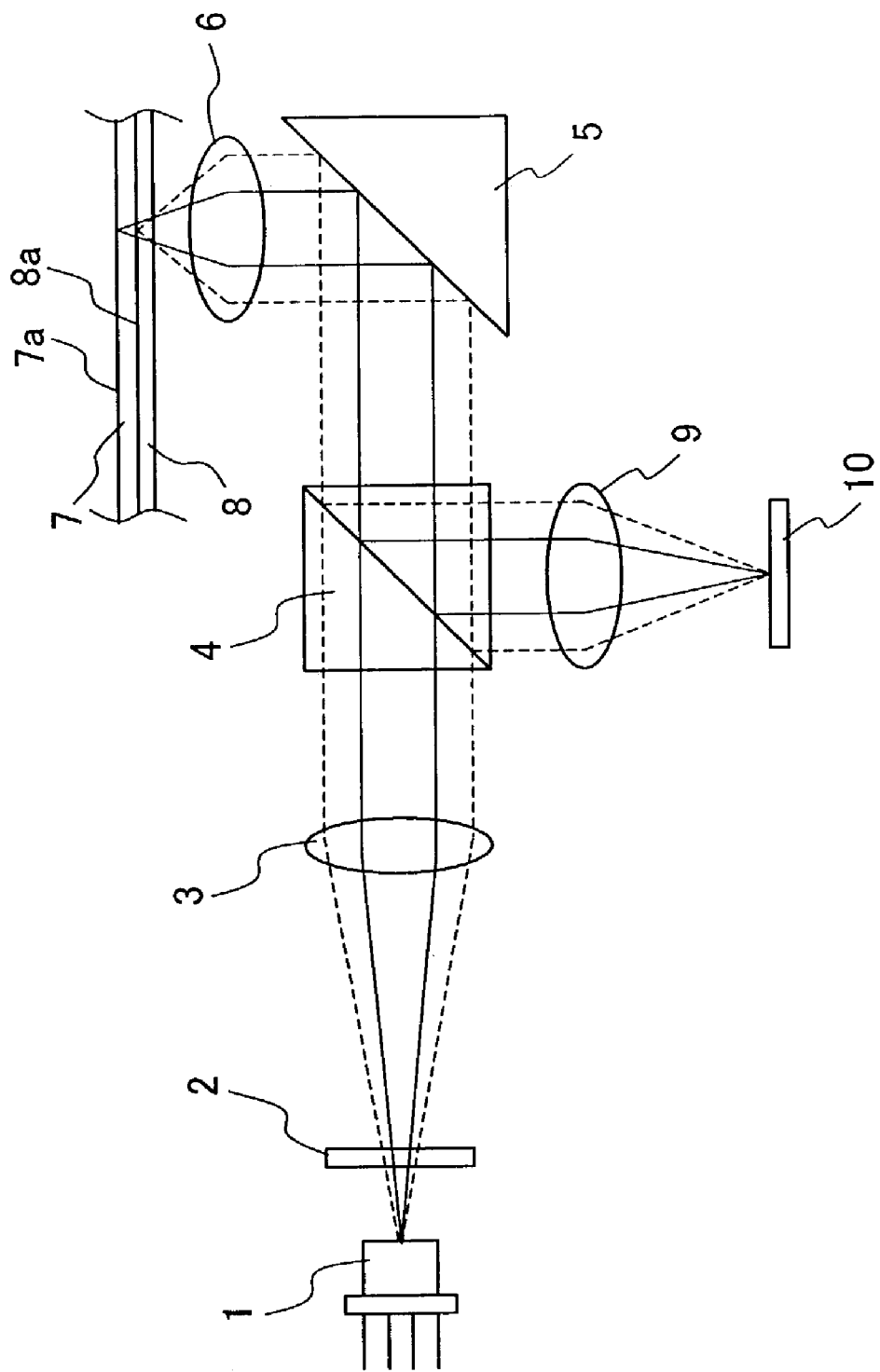
FIG. 1 shows an optical system of the optical pick-up apparatus according to one embodiment of the present invention.

According to the optical pick-up apparatus of the present invention, an optical beam of a first wavelength or an optical beam of a second wavelength is generated by a 2-wavelength semiconductor laser device, and is divided into a main beam and side beams by using a diffraction grating having one grating period. With this configuration, an optical pick-up apparatus that allows recording, reproducing or erasing with respect to a CD group disc and a DVD group disc can be configured with one semiconductor laser device and one 3-beam generating diffraction grating. As a result, the optical pick-up apparatus can be downsized easily. In addition, the number of optical components can be reduced and the adjustment step for the optical pick-up apparatus can be simplified, so that the cost can be reduced.

Preferably, in the above configuration, when the optical beam of the wavelength $\lambda 1$ is used for recording or reproducing information with respect to a first optical information medium having a track pitch of T1, and the optical beam of the wavelength of $\lambda 2$ is used for recording or reproducing information with respect to a second optical information medium having a track pitch of T2, a relationship indicated by the following formula is satisfied:

$$L2 = (2n+1)/(2m+1) \times T2/T1 \times L1$$

where L1 denotes a distance on the first optical information medium between the main beam and the side beam that are generated by diffracting the optical beam of the wavelength of $\lambda 1$ by the diffraction grating, L2 denotes a distance on the second optical information medium between the main beam and the side beam that are generated by diffracting the optical beam of the wavelength of $\lambda 2$ by the diffraction grating, and m and n are integers of 0 or more.

Preferably, in the above configuration, assuming that an angle between (a) a line on the first optical information medium, passing through centers of the main beam and the side beam that are generated by diffracting the optical beam of the wavelength of $\lambda 1$ by the diffraction grating and (b) a line perpendicular to a track pitch direction of the first optical information medium is $\alpha 1$ ($0 < \alpha 1 < 90$), and an angle between (a) a line on the second optical information medium, passing through centers of the main beam and the side beam that are generated by diffracting the optical beam of the wavelength of $\lambda 2$ by the diffraction grating and (b) a line perpendicular to a track pitch direction of the second optical information medium is $\alpha 2$ ($0 < \alpha 2 < 90$), a relationship indicated by the following formula is satisfied:

$$\alpha 1 = \alpha 2 = \sin^{-1}\{(2m+1) \times T1/2/L1\}$$

-continued
$$= \sin^{-1}\{(2n+1) \times T2/2/L2\}.$$

In the above configurations, preferably, assuming that a distance between (a) the semiconductor laser chip of the wavelength of $\lambda 1$ or the semiconductor laser chip of the wavelength of $\lambda 2$ and (b) the diffraction grating is d, where d is a value converted with a refractive index of air, an optical magnification of recording or reproducing information with respect to the first optical information medium is $\beta 1$, and an optical magnification of recording or reproducing information with respect to the second optical information medium is $\beta 2$, relationships indicated by the following formulas are satisfied:

$$\beta 1 \times \tan\{\sin^{-1}(\lambda 2/\Lambda)\} - \beta 2 \times (2n+1)/(2m+1) \times T2/T1 \times \tan\{\sin^{-1}(\lambda 1/\Lambda)\} \approx 0$$

$$d \approx \beta 1 \times L1/\tan\{\sin^{-1}(\lambda 1/\Lambda)\}$$

$$= \beta 2 \times L2/\tan\{\sin^{-1}(\lambda 2/\Lambda)\}.$$

In this way, by appropriately designing the position and the period of the diffraction grating, an optimum optical system can be configured with a single diffraction grating.

An optical pick-up apparatus according to one embodiment of the present invention will be described below, with reference to FIGS. 1 and 2. FIG. 1 shows an optical system of the optical pick-up apparatus according to the present embodiment. Although FIG. 1 shows both of a CD group disc 7 and a DVD group disc 8 for the purpose of illustration, as a practical matter, only one of these discs is loaded on a disc loading unit (not illustrated). A disc is loaded with a reverse side of its recording surface 7a or 8a facing an objective lens 6. This apparatus employs a 2-wavelength semiconductor laser device 1. The 2-wavelength semiconductor laser device 1 is provided with an infrared semiconductor laser chip and a red semiconductor laser chip that are mounted in an integral manner. In optical paths between the 2-wavelength semiconductor laser device 1 and the CD group disc 7 or the DVD group disc 8, a 3-beam generating diffraction grating 2, a collimator lens 3 and the objective lens 6 that function as a light-gathering device, a beam splitter 4, a mirror 5, a condenser lens 9 and a photodetector 10 are arranged. The beam splitter 4 divides reflected light from the disc. The reflected light divided by the beam splitter 4 is guided onto the photodetector 10 by the condenser lens 9.

The operation of this optical pick-up apparatus will be described below. When recording, reproducing or erasing information with respect to the CD group disc 7, the infrared semiconductor laser chip of the 2-wavelength semiconductor laser device 1 operates. An infrared optical beam (e.g., wavelength $\lambda 1 = 785$ nm) emitted from the 2-wavelength semiconductor laser device 1, which is indicated by a solid line, is diffracted by the 3-beam generating diffraction grating 2 so as to be divided into three optical beams (a main beam as zero-order diffracted light and side beams as ±first-order diffracted light). These three optical beams are converted from the divergent beams to parallel beams by the collimator lens 3, enter into the objective lens 6 via the mirror 5, and are focused onto the CD group disc 7. Reflected light from the CD group disc 7 passes through the objective lens 6 and the mirror 5, is directed to a different direction by the beam splitter 4, and is focused onto the photodetector 10 by the condenser lens 9. From the main beam and side beams incident on the photodetector 10, an RF signal, a focus error signal and a tracking error signal are detected.

Meanwhile, when recording, reproducing or erasing information with respect to the DVD group disc 8, the red semiconductor laser chip of the 2-wavelength semiconductor laser device 1 operates. A red optical beam (e.g., wavelength λ2=650 nm) emitted from the 2-wavelength semiconductor laser device 1, which is indicated by a dashed line, is diffracted by the 3-beam generating diffraction grating 2 so as to be divided into three optical beams (a main beam as zero-order diffracted light and side beams as±first-order diffracted light). These three optical beams are converted from the divergent beams to parallel beams by the collimator lens 3, and enter into the objective lens 6 via the mirror 5 so as to be focused onto the DVD group disc 8. Reflected light from the DVD group disc 8 passes through the objective lens 6 and the mirror 5, is directed to a different direction by the beam splitter 4, and is focused onto the photodetector 10 by the condenser lens 9. From the main beam and side beams incident on the photodetector 10, an RF signal, a focus error signal and a tracking error signal are detected.

Figure 2A:
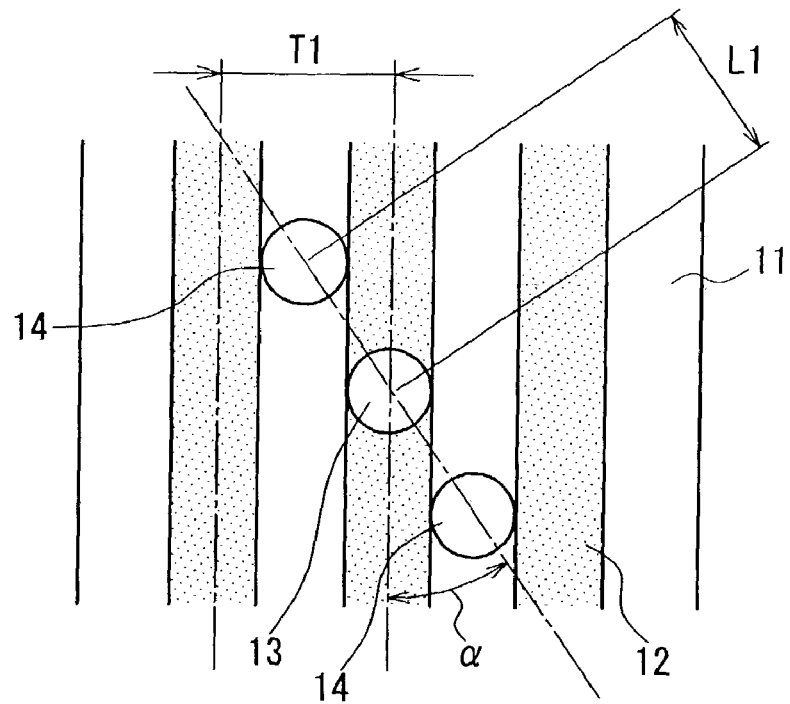
FIGS. 2A and 2B respectively show a relative positional relationship among track pitches of a CD group disc and a DVD group disc, a main beam and a side beam according to one embodiment of the present invention.
Figure 2B:
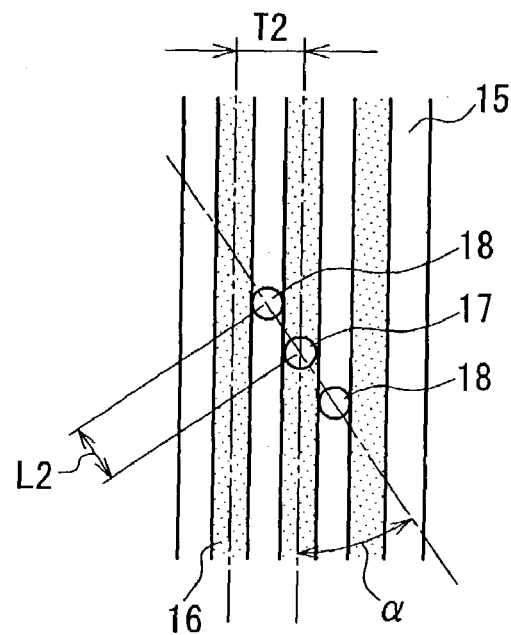
Figure 3:
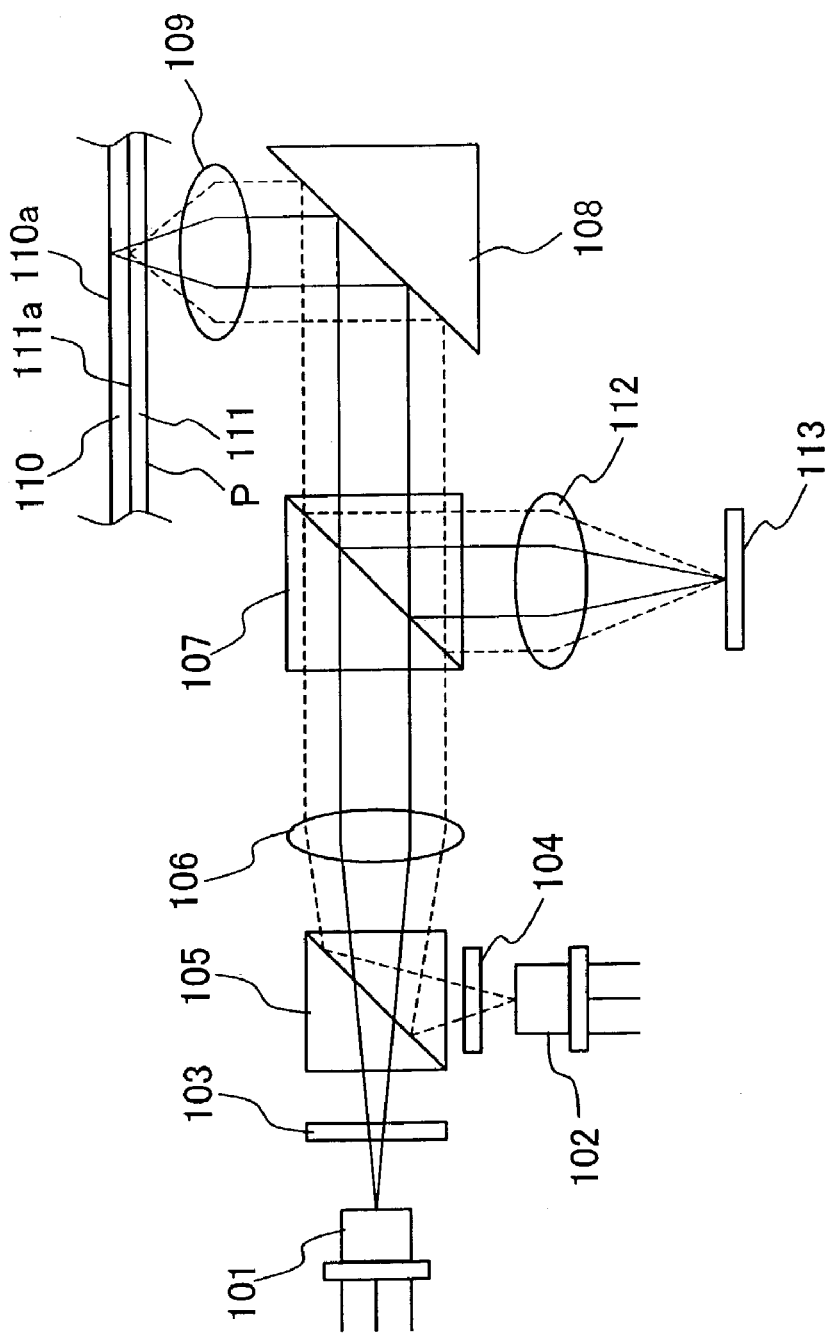
FIG. 3 shows an optical system of the conventional optical pick-up apparatus.

In accordance with the present embodiment, by setting a period Λ and a position of the 3-beam generating diffraction grating 2 as described later, a positional relationship among the respective optical beams and tracks can be obtained as shown in FIGS. 2A and 2B. Here, the position of the 3-beam generating diffraction grating 2 is represented by a length d, which is a value converted to air, from an emitting end face of the infrared/red semiconductor laser chip constituting the 2-wavelength semiconductor laser device 1 to the 3-beam generating diffraction grating 2.

FIG. 2A shows a relationship among a land 11 and a groove 12 on the CD group disc 7 (track pitch: T1) and a main beam 13 and side beams 14 that are focused onto them. FIG. 2B shows a relationship among a land 15 and a groove 16 on the DVD group disc 8 (track pitch: T2) and a main beam 17 and side beams 18 that are focused onto them. In either case, when the main beams 13 and 17 are positioned on the grooves 12 and 16, the side beams 14 and 18 are positioned on the lands 11 and 15, respectively, and also an angle α between a line passing through the centers of the main beam and the side beams and a line perpendicular to the track pitch direction becomes equal to the both groups of discs.

The following describes the period Λ and the arrangement of the 3-beam generating diffraction grating 2 in the present embodiment in detail. When the main beams and the side beams are located on the discs as shown in FIGS. 2A and 2B, relationships indicated by the following formulas are satisfied, where L1 denotes a distance between the main beam 13 and the side beam 14, L2 denotes a distance between the main beam 17 and the side beam 18, and m and n are integers of 0 or more:

$$L1 \times \sin\alpha = (2m+1) \times T1/2 \quad (1)$$

$$L2 \times \sin\alpha = (2n+1) \times T2/2 \quad (2)$$

Here, although the configuration of the present embodiment shown by FIG. 2 corresponds to the case where both of m and n are 0, the description will be given using m and n in order to show a more common case also.

In addition, assuming that a diffracted angle of the infrared light λ1 by the 3-beam generating diffraction grating 2 is θ1 and a diffracted angle of the red light λ2 by the 3-beam generating diffraction grating 2 is θ2, then relationships indicated by the following formulas are satisfied with the period Λ of the 3-beam generating diffraction grating 2:

$$\Lambda \times \sin\theta 1 = \lambda 1 \quad (3)$$

$$\Lambda \times \sin\theta 2 = \lambda 2 \quad (4)$$

Furthermore, assuming that an optical magnification of recording, reproducing or erasing information with respect to the CD group disc is β1 and an optical magnification of recording, reproducing or erasing information with respect to the DVD group disc is β2, then relationships indicated by the following formulas are satisfied between the distance L1 or L2 and the length d from an emitting end face of the infrared/red semiconductor laser chip to the 3-beam generating diffraction grating 2, where d is a value converted with a refractive index of air:

$$d \times \tan\theta 1 \approx \beta 1 \times L1 \quad (5)$$

$$d \times \tan\theta 2 \approx \beta 2 \times L2 \quad (6)$$

From these formulas (1) through (6), a relationship between the period Λ (undefined value) of the 3-beam generating diffraction grating 2 and T1, T2, β1, β2, m, n, λ1 and λ2, which are defined values, will be determined as follows:

$$\beta 1 \times \tan\{\sin^{-1}(\lambda 2/\Lambda)\} - \beta 2 \times (2n+1)/(2m+1) \times T2/T1 \times \tan\{\sin^{-1}(\lambda 1/\Lambda)\} \approx 0 \quad (7)$$

Therefore, the period Λ of the diffraction grating 2 can be determined from the formula (7).

Meanwhile, as for L1, L2 and d, firstly an appropriate value for L1 is selected in terms of the system of the optical drive apparatus. Then, L2 can be determined from the formulas (1) and (2) as follows:

$$L2 = (2n+1)/(2m+1) \times T2/T1 \times L1 \quad (8)$$

Moreover, the corresponding d and α can be determined from the formulas (1), (2), (5) and (6) as follows:

$$\alpha = \sin^{-1}\{(2m+1) \times T1/2/L1\} \quad (9)$$

$$d \approx \beta 1 \times L1 / \tan\{\sin^{-1}(\lambda 1/\Lambda)\} \quad (10)$$

$$= \beta 2 \times L2 / \tan\{\sin^{-1}(\lambda 2/\Lambda)\}$$

By using the above-stated relationships regarding the position and the period of the 3-beam generating diffraction grating 2, an optical pick-up apparatus that allows information to be recorded, reproduced or erased with respect to optical discs having different track pitches can be configured with only one 2-wavelength semiconductor laser device 1 and only one 3-beam generating diffraction grating 2. As a result, there is no need to use two semiconductor laser devices and two 3-beam generating diffraction gratings as in the conventional case, thus facilitating the miniaturization of the apparatus.

In addition, the number of optical components can be reduced and the adjustment step for the optical pick-up apparatus can be simplified, so that the cost can be reduced significantly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical pick-up apparatus, comprising:
   a semiconductor laser light source that generates an optical beam;
   a diffraction grating that divides the optical beam into a main beam and side beams;
   a collimator lens and an objective lens that function as a light-gathering device for gathering beams from the diffraction grating;
   an optical element that guides the main beam and the side beams passing through the collimator lens onto an optical information medium; and
   a photodetector that detects a signal from reflected light reflected from the optical information medium,
   wherein
   the semiconductor laser light source is configured with a 2-wavelength semiconductor laser device in which a semiconductor laser chip that generates an optical beam having a wavelength of $\lambda 1$ and a semiconductor laser chip that generates an optical beam having a wavelength of $\lambda 2$ are integrated into one chip or are arranged in proximity to each other,
   an optical magnification determined by the collimator lens and the optical element are different between the optical beam having the wavelength $\lambda 1$ and the optical beam having the wavelength $\lambda 2$,
   the diffraction grating has one grating period $\Lambda$ by which each of the optical beams having the wavelength $\lambda 1$ and the optical beam having the wavelength $\lambda 2$, which are generated by the 2-wavelength semiconductor laser device, is divided into a main beam and side beams,
   the optical pick-up apparatus is configured so as to record or reproduce information with respect to optical information media having different track pitches and perform tracking control associated with the recording and the reproducing
   when the optical beam of the wavelength $\lambda 1$ is used for recording or reproducing information with respect to a first optical information medium having a track pitch of T1, and the optical beam of the wavelength of $\lambda 2$ is used for recording or reproducing information with respect to a second optical information medium having a track pitch of T2, a relationship indicated by the following formula is satisfied:

$$L2 = (2n+1)/(2m+1) \times T2/T1 \times L1$$

where L1 denotes a distance on the first optical information medium between the main beam and the side beam that are generated by diffracting the optical beam of the wavelength of $\lambda 1$ by the diffraction grating, L2 denotes a distance on the second optical information medium between the main beam and the side beam that are generated by diffracting the optical beam of the wavelength of $\lambda 2$ by the diffraction grating, and m and n are integers of 0 or more, and
   assuming that a distance between (a) the semiconductor laser chip of the wavelength of $\lambda 1$ or the semiconductor laser chip of the wavelength of $\lambda 2$ and (b) the diffraction grating is d, where d is a value converted with a refractive index of air, relationships indicated by the following formulas are satisfied:

$$\beta 1 \times \tan\{\sin^{-1}(\lambda 2/\Lambda)\} - \beta 2 \times (2n+1)/(2m+1) \times T2/T1 \times \tan\{\sin^{-1}(\lambda 1/\Lambda)\} \approx 0$$

$$d \approx \beta 1 \times L1 / \tan\{\sin^{-1}(\lambda 1/\Lambda)\}$$
   $$= \beta 2 \times L2 / \tan\{\sin^{-1}(\lambda 2/\Lambda)\}.$$

where $\beta 1$ and $\beta 2$ denote optical magnifications in recording or reproducing information with respect to the first and second optical information medium, respectively.

2. The optical pick up apparatus according to claim 1, wherein
   assuming that an angle between (a) a line on the first optical information medium, passing through centers of the main beam and the side beam that are generated by diffracting the optical beam of the wavelength of $\lambda 1$ by the diffraction grating and (b) a line perpendicular to a track pitch direction of the first optical information medium is $\alpha 1$ ($0 < \alpha 1 < 90$), and
   an angle between (a) a line on the second optical information medium, passing through centers of the main beam and the side beam that are generated by diffracting the optical beam of the wavelength of $\lambda 2$ by the diffraction grating and (b) a line perpendicular to a track pitch direction of the second optical information medium is $\alpha 2$ ($0 < \alpha 2 < 90$),
   a relationship indicated by the following formula is satisfied:

$$\alpha 1 = \alpha 2 = \sin^{-1}\{(2m+1) \times T1/2/L1\}$$
   $$= \sin^{-1}\{(2n+1) \times T2/2/L2\}.$$

* * * * *